(No Model.) 2 Sheets—Sheet 1.
D. BARKER & A. C. LAIRD.
ROAD CART.
No. 536,369. Patented Mar. 26, 1895.
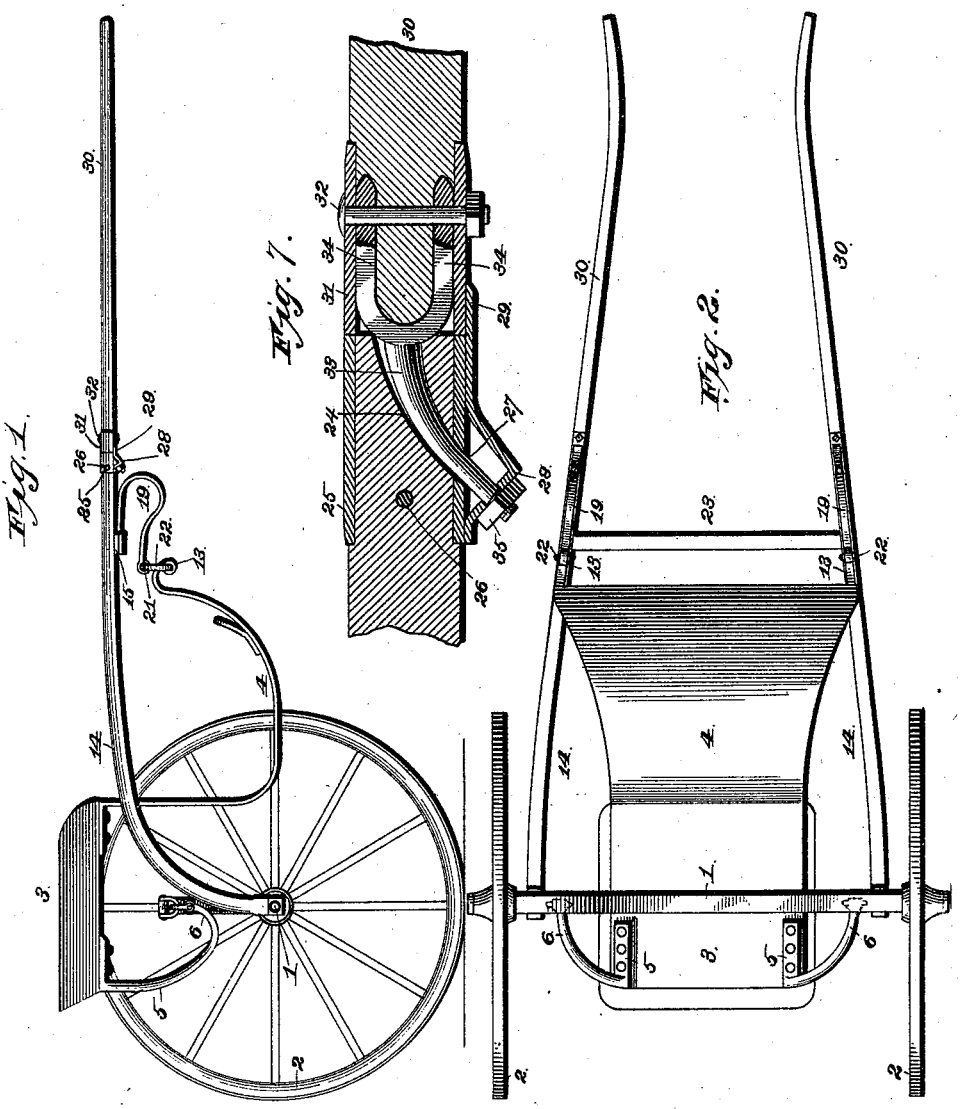
Witnesses:
Inventors:
D. Barker and A. C. Laird,
By Hixson & Hixson
attys.

(No Model.) 2 Sheets—Sheet 2.
D. BARKER & A. C. LAIRD.
ROAD CART.
No. 536,369. Patented Mar. 26, 1895.
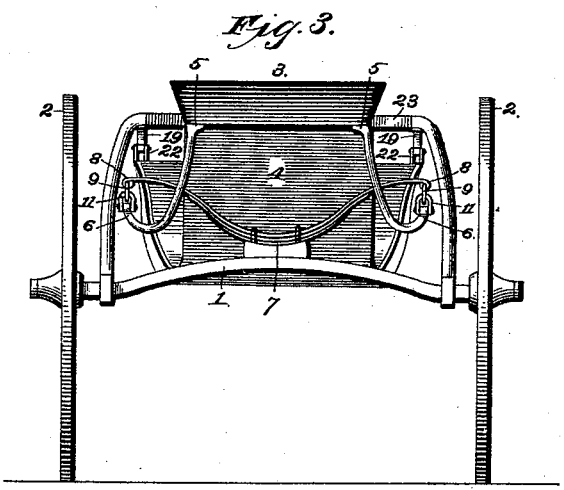
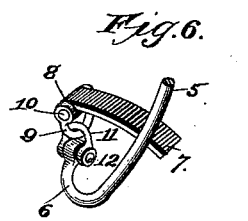
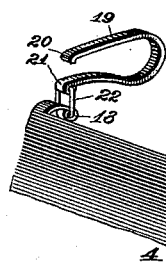
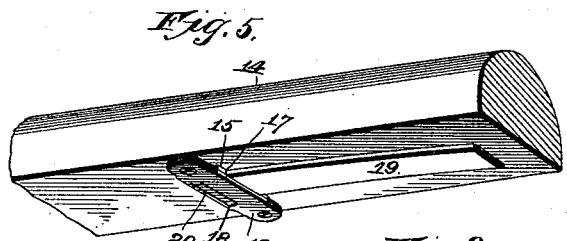
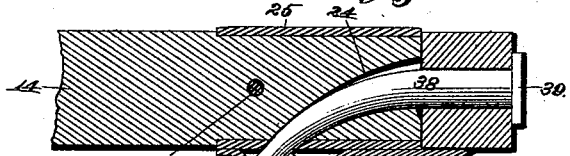
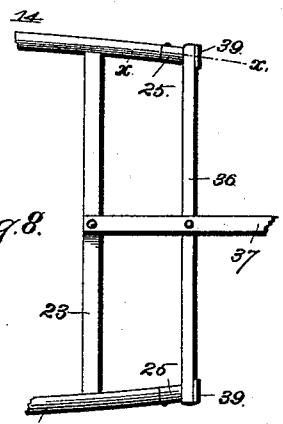
Witnesses:
Inventors:
D. Barker & A. C. Laird,
By Higdon & Higdon
attys.

UNITED STATES PATENT OFFICE.

DELL BARKER AND ARTEMAS C. LAIRD, OF RICHLAWN, MISSOURI, ASSIGNORS TO CHARLES M. HARRISON AND HENRY C. HARRISON, OF LAWRENCEVILLE, GEORGIA.

ROAD-CART.

SPECIFICATION forming part of Letters Patent No. 536,369, dated March 26, 1895.

Application filed August 9, 1894. Serial No. 520,734. (No model.)

*To all whom it may concern:*

Be it known that we, DELL BARKER and ARTEMAS C. LAIRD, of Richlawn, Cass county, Missouri, have invented certain new and useful Improvements in Road-Carts, of which the following is a full, clear, and exact description, reference being had to the accompanying drawings, forming a part hereof.

Our invention relates to road carts, and our objects are to provide, first, an improved vehicle of the class wherein the body-portion is pivotally and elastically supported so that it will not partake of the vibratory movement or jolting of the shafts, incident to every two-wheeled vehicle having the body-portion rigidly connected to any other part of the vehicle; secondly, to provide a vehicle which may at pleasure be transposed from a single-horse to a double-horse vehicle, and vice versa, and, thirdly, to provide a vehicle of this character which is simple, strong, durable, and inexpensive of construction.

With these objects in view, the invention consists in certain novel and peculiar features of construction and combinations of parts, as will be hereinafter described and claimed.

In order that the invention may be fully understood, reference is to be had to the accompanying drawings, in which—

Figure 1. is a side elevation, with the near wheel removed, of a road cart embodying our invention. Fig. 2. is an inverted plan view of the same. Fig. 3. is a rear view of the same. Fig. 4. is a perspective view, showing part of the body-portion, and its manner of connection with the front supporting springs. Fig. 5. is a detail perspective view enlarged of a portion of one of the draft-bars, and showing the manner of securing to the under side of the same the front supporting springs. Fig. 6. is a detail perspective view showing a portion of the rear spring, and the pivotal or swiveled connection of the same with one of the rods depending from the body-portion of the vehicle. Fig. 7. is a vertical sectional view enlarged of the front end of one of the draft-bars, and showing the manner of securing thereto the shafts. Fig. 8. is a plan view of a portion of the draft-bars, and showing the same provided or connected up with the double-horse attachment, and Fig. 9. is a sectional view on an enlarged scale taken on the line *x—x* of Fig. 8.

In the said drawings, 1 designates the axle of the vehicle, and mounted rotatably upon the opposite ends of the same in the ordinary manner, are the supporting wheels 2. The body-portion of the vehicle comprises the seat 3, and the foot-portion 4, and is operatively supported as follows: Rods 5, of steel or any other suitable material, are bolted or otherwise rigidly secured to the under side of the seat, and depending from the same, preferably curve outwardly and forwardly as shown at 6, and terminate in eyes at their free ends. Secured upon a block carried by the rear axle in the ordinary manner, is the rear supporting spring 7, of the usual or any preferred construction, and this spring 7 terminates in eyes 8, which are vertically and a suitable distance above the eyes of the depending rods 5, and the free ends of said spring are pivotally connected or swiveled to the adjacent ends of said depending arms by the semi-circular or U-shaped links 9, which are pivotally secured to the ends of the spring 7 by means of the bolts 10, and the similar semi-circular or U-shaped links 11, which engage the links 9, and are pivotally connected to the free ends of said depending rods by the bolts 12, as shown most clearly in Fig. 6.

It will be observed that the links 9 and 11 are disposed at right angles to each other so that in case the wheel at one side rides over an obstruction, the spring, due to the pressure or weight of the body-portion and the occupants of the vehicle, will swing laterally toward the elevated wheel, and this movement is freely permitted by the links 9, which are pivoted to operate in a plane at right angles to the rotative disposition of the wheels, so that it is apparent that the body-portion is to a certain extent independent of both the up and down motion of the draft animal or animals, and the rise and fall of the wheels due to irregularities in the surface of the ground.

The foot-portion 4 of the vehicle either carries or has secured thereto the forwardly curved extensions 13, which terminate in eyes at their front ends, and these extensions are arranged vertically beneath the slightly converging draft-bars 14, which are curved downwardly at their rear end, and are secured rigidly to the axle in the usual or any preferred manner, and terminate at their opposite ends a short distance forward of the front end of the foot-portion 4. These draft-bars 14 correspond in function to and really form an extension of the shafts of the vehicle, when the same is employed or used in connection with a single draft-animal. Secured transversely to the under side of said draft-bars a suitable distance from their front ends and preferably forward of the front end of the foot-portion 4, are the plates 15 and 16, which conjointly form brackets having the longitudinal recesses 17 in their upper sides, and vertical apertures 18, which communicate with the recesses 17, and the front supporting springs 19, which are approximately semi-elliptical, have their upper arms engaging the recesses 17, and are bent downwardly at their rear ends, to form the hook-portions 20, which engage the vertical apertures 18 of the said brackets, so as to afford a reliable and secure connection between said brackets and the upper arms of said springs. The lower arms of the said springs preferably terminate at their rear ends in the eyes 21, which are arranged above and in the same vertical plane as the eyes of the extensions 13 of the foot-portion, and are pivoted thereto through the medium of links 22, and in order to secure the said draft-bars at the proper distance apart, the cross-bar 23 is employed to connect the same near their free ends.

From the above description, it will be apparent that the body-portion is entirely free and independent of the up and down movement of the draft-bars, and will remain practically stationary at all times, owing to the pivotal or swiveled connection between the supporting springs and the said body-portion, and therefore will be found to possess great advantages over all other vehicles of this type or character, which have the body-portion rigidly connected to the supporting spring or to any other part of the vehicle, and therefore respond to all vibratory movements of the shaft, and any jarring which the vehicle may receive.

The front end of each draft-bar is provided with a hole or aperture 24, which curves downwardly and longitudinally toward the rear, and embracing the free end of said shafts are the sleeves or collars 25, which are secured rigidly in position by the cross-bolts or pins 26, and are provided in their lower sides with the oblique holes 27, which continue and form a part of the holes or apertures 24. These sleeves or collars are also reinforced at their under side by strips or plates, which are welded or otherwise rigidly secured to said sleeves or collars, and are provided near their rear ends with the portions 28, which are disposed oppositely to the oblique holes 27, and with the forwardly projecting extensions 29.

When it is desired to employ only one draft-animal, the shafts 30, are used, said shafts being constructed so that they may be easily, expeditiously and securely attached to form a continuation of the draft-bars as follows: Sleeves or collars 31 embrace the rear ends of the shafts 30, and are secured rigidly in such position by the vertical bolts 32, which are engaged at their lower ends by retaining-nuts, in the ordinary manner. Bolts 33, which are curved to correspond with and fit snugly in the holes or apertures 24, are bifurcated or forked at their front ends, so as to provide forwardly projecting and parallel arms 34, and these arms are provided with vertically aligned apertures, through which extend the bolts 32, which thus secure rigidly in position both the sleeves or collars 31 and the said bolts. To secure the shafts thus constructed in position, it is only necessary to cause the engagement of the bolts 33 with the apertures 24, and said bolts being of suitable length, project rearwardly through aligned apertures in the portions 28 of the reinforce plates hereinbefore described, and are engaged at their projecting ends by the retaining-nuts 35, which bear against said portions 28, and clamp the shafts firmly against the ends of the draft-bars. The shafts are additionally secured from lateral or rotatable movement by the extensions 29, which fit snugly and squarely against the lower and flat side of the sleeves or collars 31. To remove the shafts, it is only necessary to unscrew the nut 35, and pull the shafts longitudinally forward so as to disengage the bolts from their apertures 24.

When it is desired to employ two draft-horses or more in connection with the vehicle, the front ends of the draft-bars are braced and connected by the cross-bar 36, which carries the tongue 37, which is also secured to the cross-bar 23. The tongue is provided with double-tree and single-trees, but these being of the ordinary construction and arrangement render it unnecessary to describe and illustrate them herein. The cross-bar 36 is provided in each end with an aperture, through which project toward the rear the bolts 38, which are curved like the bolts 33, previously described, and these bolts 38, are provided at their front ends with the enlarged and laterally projecting heads 39, which bear firmly against the front side of the cross-bar. When the cross-bar is in operative position, the bolts 38 engage the apertures 24, and project through the apertures of the portions 28 of the reinforce plates, and have their projecting ends engaged by the retaining and clamping nuts 35, and are also additionally braced and supported by the extensions 29 of the said reinforce plates, as clearly shown in Fig. 9.

From the above description, it will be apparent that we have produced an improved road cart wherein the body-portion is entirely free and independent of the vibratory movement of the shafts, which is caused by the up and down movement of the draft-animal;

which may be converted from a one-horse vehicle into a two-horse vehicle and vice versa, and which is simple, strong, durable, and inexpensive of construction.

Having thus described our invention, what we claim as new, and desire to secure by Letters Patent, is—

1. In a road-cart, the combination with a wheeled framework and a spring carried by the axle, and springs carried by the draft-bars of the same, of a body-portion, rods depending therefrom, links 9, pivotally carried by said rods, links carried by the spring secured to the axle, and engaging the links carried by said depending rods, one set of said links being adapted to swing in a plane parallel with the direction of travel, and links pivotally connecting the front end of the body-portion with the springs carried by the draft-bars in such manner that they will swing in a vertical plane parallel with the direction of travel, substantially as set forth.

2. In a road vehicle, the combination with a wheel-supported framework, and draft-bars carried thereby, and provided with longitudinal and curved apertures in their front ends, of shafts, provided with curved bolts engaging said apertures, and clamping-nuts engaging the projecting ends of said bolts, substantially as set forth.

3. In a road vehicle, the combination with a wheeled framework, provided with draft-bars having curved apertures in their front ends, sleeves secured upon the front ends of said draft-bars, and reinforce plates secured to the under side of said sleeves and projecting beyond the front ends thereof, of shafts, sleeves embracing the rear ends of the same, and resting upon the said reinforce-plates, curved bolts carried by said shafts and projecting through the curved apertures of the draft-bars, and nuts engaging the projecting ends of said bolts, substantially as set forth.

4. In a road vehicle, the combination with a wheeled framework, provided with draft-bars having curved apertures in their front ends, apertured sleeves secured upon the front ends of said shaft-bars, and apertured reinforce plates secured to the under sides of said sleeves and projecting beyond the front ends of the draft-bars, of shafts, sleeves embracing the rear ends of said shafts and resting upon the said plates, curved bolts projecting through the apertured draft-bars, sleeves and reinforce plates and provided with bifurcated front ends, bolts extending through aligned apertures in the last-mentioned sleeves, the shafts and the bifurcated ends of said curved bolts, nuts engaging the projecting ends of the curved bolts, and nuts engaging the ends of the bolts extending through the bifurcated ends of said curved bolts, substantially as set forth.

5. In a road vehicle, the combination with a wheeled-framework, provided with draft-bars having curved apertures in their front ends, metallic sleeves embracing the free ends of said draft-bars, a cross-bar carrying the tongue, curved bolts carried by said cross-bar and engaging the curved aperture of the draft-bars, and provided with enlarged heads which bear against the front side of said cross-bar, and clamping-nuts engaging the projecting ends of said bolts, to secure said cross-bar firmly in position, substantially as set forth.

In testimony whereof we affix our signatures in presence of two witnesses.

DELL BARKER.
ARTEMAS C. LAIRD.

Witnesses as to the signatures of Dell Barker:
M. R. REMLEY,
G. Y. THORPE.

Witnesses as to the signature of Artemas C. Laird:
A. J. CHILDS,
B. F. NORVELL.